(12) United States Patent
Zuraski et al.

(10) Patent No.: US 8,851,348 B2
(45) Date of Patent: Oct. 7, 2014

(54) PORTABLE LOCK MOUNTING ASSEMBLY

(75) Inventors: Robert D. Zuraski, Taunton, MA (US); John Paul Thambusami Joy Sachidanadam, Stoughton, MA (US)

(73) Assignee: Schlage Lock Company LLC, Indianapolis, IN (US)

( * ) Notice: Subject to any disclaimer, the term of this patent is extended or adjusted under 35 U.S.C. 154(b) by 210 days.

(21) Appl. No.: 13/392,228

(22) PCT Filed: Aug. 27, 2010

(86) PCT No.: PCT/US2010/046897
§ 371 (c)(1),
(2), (4) Date: Apr. 30, 2012

(87) PCT Pub. No.: WO2011/025910
PCT Pub. Date: Mar. 3, 2011

(65) Prior Publication Data
US 2012/0205506 A1    Aug. 16, 2012

Related U.S. Application Data

(60) Provisional application No. 61/237,378, filed on Aug. 27, 2009.

(51) Int. Cl.
| | | |
|---|---|---|
| *B62J 11/00* | (2006.01) | |
| *B62J 6/02* | (2006.01) | |
| *B62J 7/08* | (2006.01) | |
| *E05B 71/00* | (2006.01) | |
| *B62H 5/00* | (2006.01) | |
| *E05B 17/00* | (2006.01) | |
| *E05B 67/38* | (2006.01) | |

(52) U.S. Cl.
CPC ............. *E05B 71/00* (2013.01); *E05B 17/0045* (2013.01); *E05B 2067/386* (2013.01); *B62H 5/00* (2013.01)

USPC .................. 224/425; 248/316.2; 248/551

(58) Field of Classification Search
CPC ...... B62H 5/00; E05B 2067/386; E05B 71/00
USPC ........... 248/220.22, 316.1, 229.1, 316.2, 551; 224/274, 279, 420, 425
See application file for complete search history.

(56) References Cited

U.S. PATENT DOCUMENTS

| | | | | |
|---|---|---|---|---|
| 4,736,921 A | * | 4/1988 | Zane et al. ................ | 248/316.2 |
| 5,395,018 A | * | 3/1995 | Studdiford .................... | 224/420 |

(Continued)

FOREIGN PATENT DOCUMENTS

| | | |
|---|---|---|
| DE | 298 09 997 U1 | 8/1998 |
| DE | 20 2004 005 928 U1 | 7/2004 |
| DE | 20 2006 008 849 U1 | 8/2006 |
| DE | 10 2007 037 439 A1 | 2/2009 |

(Continued)

OTHER PUBLICATIONS

International Search Report and Written Opinion for PCT International Application No. PCT/US2010/046897 mailed Nov. 23, 2010.

(Continued)

*Primary Examiner* — Anita M King
(74) *Attorney, Agent, or Firm* — RatnerPrestia (57) ABSTRACT

A portable lock mounting assembly including a body defining a lock retaining mechanism and a contact surface. A strap having first and second ends is attachable to the body such that a loop facing the contact surface is defined by the strap. A cam member is supported by the body adjacent the contact surface and is pivotal between a first position wherein the cam member extends generally parallel to the contact surface and a second position wherein the cam member extends at an angle relative to the contact surface.

19 Claims, 11 Drawing Sheets

(56) References Cited

U.S. PATENT DOCUMENTS

| | | | |
|---|---|---|---|
| 5,458,308 A * | 10/1995 | Lin | 248/229.16 |
| 5,704,526 A * | 1/1998 | Kuo | 224/425 |
| 6,095,386 A * | 8/2000 | Kuo | 224/448 |
| 6,422,442 B1 * | 7/2002 | McDaid et al. | 224/441 |
| 6,557,808 B1 * | 5/2003 | Ling | 248/229.1 |
| 7,311,233 B2 * | 12/2007 | Chen | 224/425 |
| 8,083,112 B2 * | 12/2011 | Kuo | 224/425 |
| 8,132,700 B2 * | 3/2012 | Dacko | 224/431 |
| 2007/0119887 A1 * | 5/2007 | Foley | 224/324 |

FOREIGN PATENT DOCUMENTS

| | | |
|---|---|---|
| DE | 20 2008 016 511 U1 | 3/2009 |
| EP | 0 832 812 A2 | 4/1998 |
| WO | WO 2009/158326 A2 | 12/2009 |

OTHER PUBLICATIONS

Chinese Patent Office Notification of the First Office Action for CN 201080037876.3 dated Jan. 20, 2014.

EPO Office Action for EP 10 749 577.2 dated Feb. 5, 2014.

* cited by examiner

PORTABLE LOCK MOUNTING ASSEMBLY

CROSS-REFERENCE TO RELATED APPLICATIONS

This application is a U.S. National Phase Application of PCT International Application No. PCT/US2010/046897, filed Aug. 27, 2010, which claims benefit of priority from U.S. Provisional Application No. 61/237,378, filed Aug. 27, 2009. The contents of these applications are incorporated herein by reference.

FIELD OF THE INVENTION

The present invention relates to mounting assemblies for temporarily stowing locks, for example, bicycle U-locks and cable locks, when not in use, and for releasing the locks for ready use when needed or maintaining a portion of the lock housing during use.

BACKGROUND OF THE INVENTION

Since the invention of bicycle U-locks and cable locks, a variety of holders is have been proposed for removably carrying such a lock when the bicycle is in use, rather than parked. Such a U-lock typically comprises a semi-enclosure member or shackle having legs or fittings with configured feet, a straight crossbar having openings for reception of these feet, and a locking mechanism in the crossbar for retaining or releasing these feet. Such a cable lock typically comprises a cable having at one end a leg or fitting with a configured foot, a bar extending from the other end of the cable and having an opening for reception of this foot, and a locking mechanism in the bar for retaining or releasing this foot. For protection against theft, this tie lock assemblage ties a strut or the like of the bicycle to a post, rail or other station.

The objectives of a holder for such locks are to carry the lock securely on the bicycle frame without rattling, to position the lock inconspicuously on the bicycle frame without hindering movement of the cyclist, and yet to facilitate convenient release of the lock from the holder whenever needed. Prior art holders have not completely met these objectives.

BRIEF SUMMARY OF THE INVENTION

In one aspect, the invention provides a portable lock mounting assembly including a body defining a lock retaining mechanism and a contact surface. A strap having first and second ends is attachable to the body such that a loop facing the contact surface is defined by the strap. A cam member is supported by the body adjacent the contact surface and is pivotal between a first position wherein the cam member extends generally parallel to the contact surface and a second position wherein the cam member extends at an angle relative to the contact surface.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Figure 1:
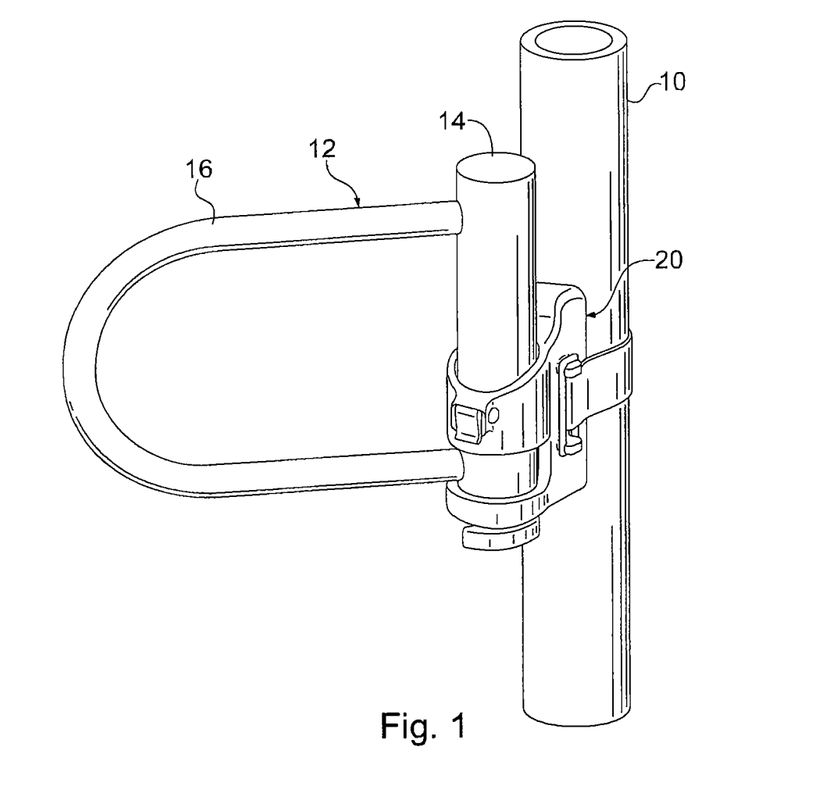
FIG. 1 shows a mounting assembly attached to a bicycle frame component and a lock member positioned in the mounting assembly.

Referring to FIGS. 1-7, a mounting assembly 20 in accordance with an exemplary embodiment of the invention will be described. FIG. 1 shows mounting assembly 20 attached to a bicycle frame component 10 with a U-lock 12 supported in the mounting assembly 20. The U-lock 12 includes a lock housing 14 and a shackle 16. While the invention is illustrated herein with a U-lock, the invention is not limited to such and may be utilized with various portable locks, including, but not limited to, modular locks as described in PCT International Application No. PCT/US09/048,226, incorporated herein by reference. Additionally, while the mounting assembly 20 is illustrated herein attached to a bicycle frame, the invention is not limited to such, but may be utilized in various applications.

Figure 2:
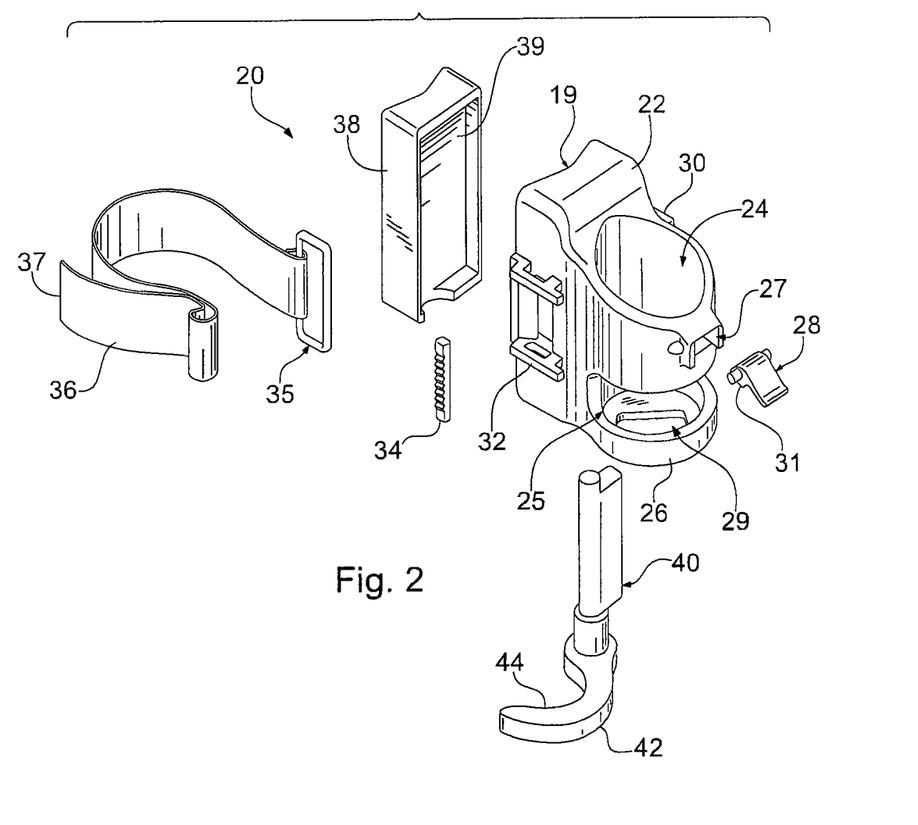
FIG. 2 shows an exploded view of the mounting assembly.
Figure 5:
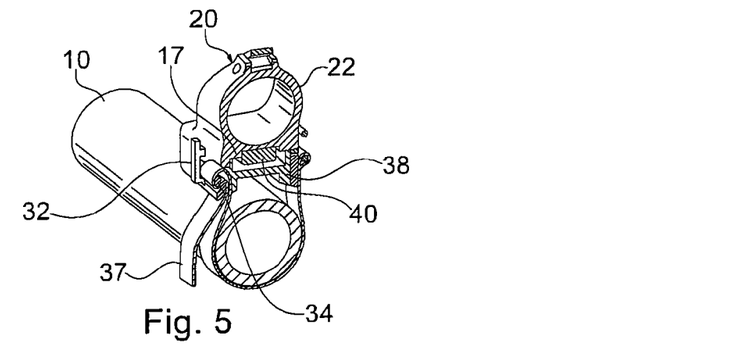
FIG. 5 shows a cross-sectional view of the mounting assembly positioned on the bicycle frame component, wherein the strap of the mounting assembly is shown in a loosened state.
Figure 6:
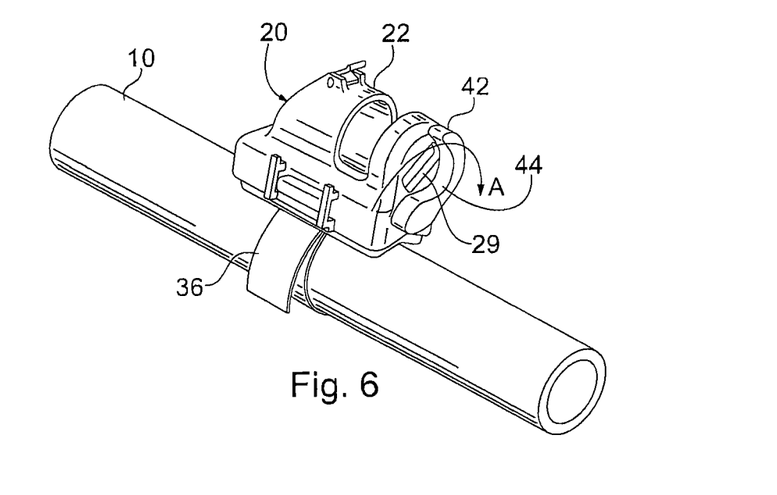
FIG. 6 shows the mounting assembly positioned on the bicycle frame component, wherein the strap of the mounting assembly is shown in a tightened state.

Referring to FIG. 2, the mounting assembly 20 of the exemplary embodiment generally comprises a bracket body 22, a strap 36 and a cam 40. The bracket body 22 defines a lock receiving opening 24 with an end cap 26 with a slot 29 defined therein, as will be described hereinafter. The bracket body 22 includes a fixed strap support 30 and a free end strap support 32 which supports a strap buckle 34. The cam 40 is supported on the bracket body 22 between a contact surface 23 thereof and a bracket insert 38 which defines a secondary contact surface 39. Preferably, the bracket insert 38 has a configuration opposite the secondary contact surface 39 which is compliments the bicycle frame or other object to which the mounting assembly 20 is to be connected. In the preferred embodiment, as illustrated in FIG. 5, the bracket insert 38 and the cam 40 are positioned within a recessed portion 25 of the body 22. The recessed portion 25 defines a generally confined area about the contact surface 23. The cam 40 is connected to a cam lever 42 outside of the bracket body 22.

Figure 3:
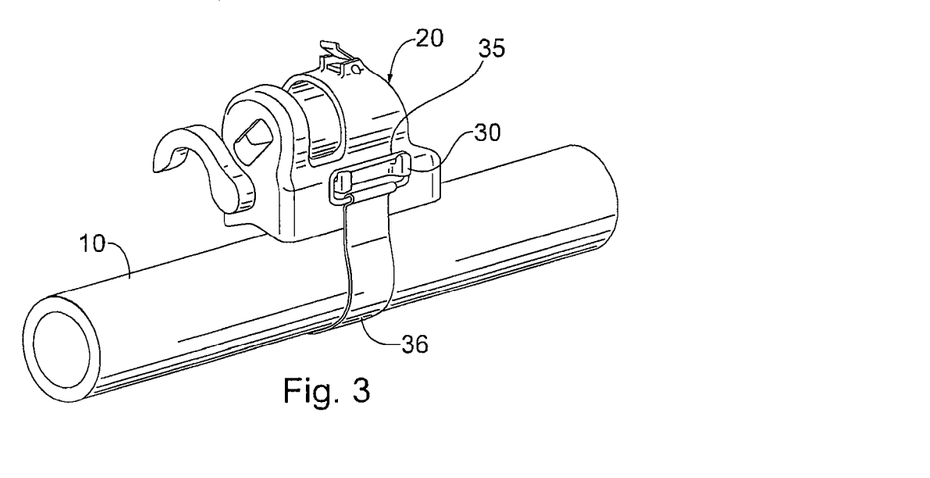
FIGS. 3 and 4 show the mounting assembly positioned on the bicycle frame component, wherein a strap of the mounting assembly is shown in a loosened state.
Figure 4:
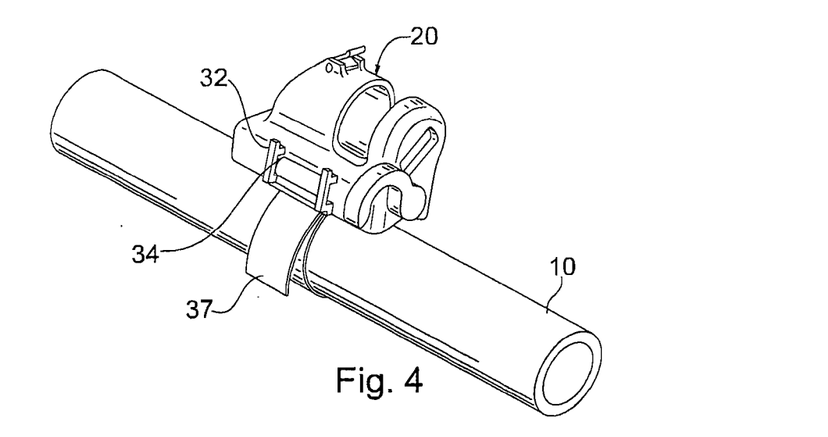

Referring to FIGS. 3-7, mounting of the mounting assembly 20 will be described. The mounting assembly 20 is positioned on the frame 10 at a desired location. A strap ring 35 on one end of the strap 36 is positioned on to the fixed strap support 30 as shown in FIG. 3. The strap 36 is wrapped around the frame 10 and the free end 37 is fed through the free end strap support 32 and about the strap buckle 34 as shown in FIGS. 4 and 5. The strap free end 37 is pulled such that the strap 36 is firm and snug against the frame 10. At this time, the cam 40 is positioned between the bracket body 22 and the bracket insert 38 in a neutral position such that it applies substantially no biasing force on the bracket insert. To further tighten the mounting assembly 20 to the frame 10, the cam lever 42 is rotated as indicated by arrow A in FIG. 6 such that the cam 40 is rotated to the position illustrated in FIG. 7. Rotation of the cam 40 causes a biasing force on the bracket insert 38 which forces the bracket insert 38 away from the bracket body 22. Since the strap 36 is held tight by the strap supports 30, 32, the strap 36 stretches about the frame 10, hence tightening the mounting assembly 20 on to the frame 10.

Figure 7:
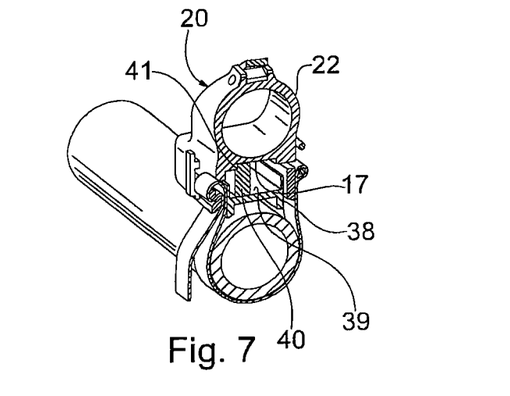
FIG. 7 shows a cross-sectional view of the mounting assembly positioned on the bicycle frame component, wherein the strap of the mounting assembly is shown in a tightened state.

Referring to FIG. 7, in the exemplary embodiment, as the cam 40 is rotated past 90°, for example to about 97°, the tension in the strap 36 and thereby the tension of the bracket insert 38 against the cam 40 locks the cam 40 against cam stops 41 in the bracket body 22. Preferably the angle is between approximately 91 degrees and 100 degrees.

Figure 8:
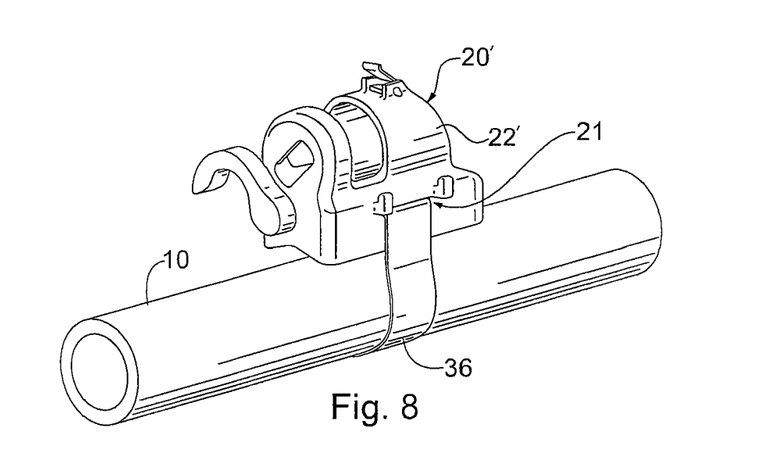
FIGS. 8 and 10 show a different mounting assembly positioned on the bicycle frame component, wherein the strap of the mounting assembly is shown in a loosened state.
Figure 9:
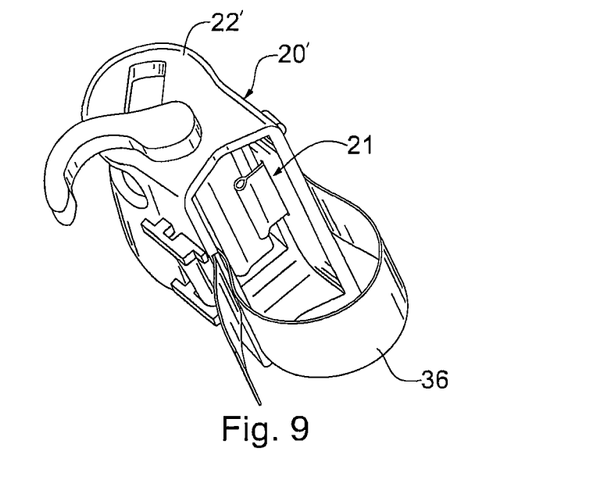
FIG. 9 depicts the mounting assembly of FIG. 8 in a loosened state.
Figure 10:
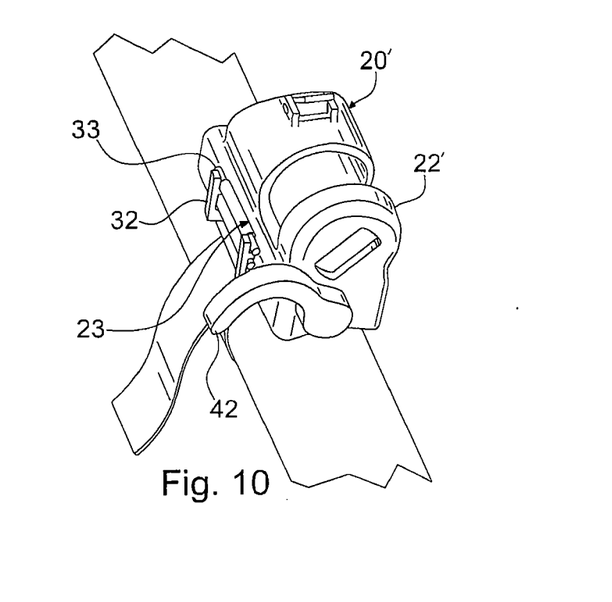
Figure 11:
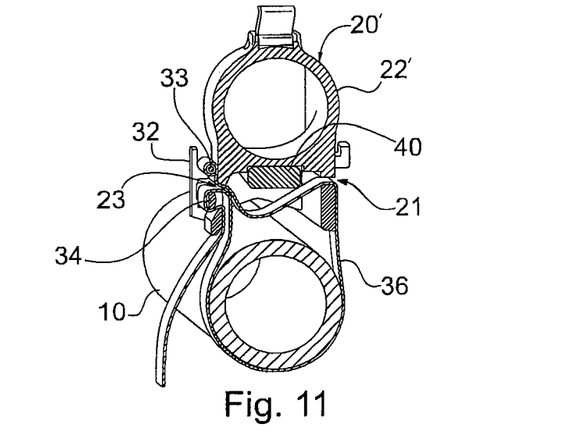
FIG. 11 shows a cross-sectional view of the mounting assembly of FIG. 8 positioned on the bicycle frame component, wherein the strap of the mounting assembly is shown in a loosened state.
Figure 12:
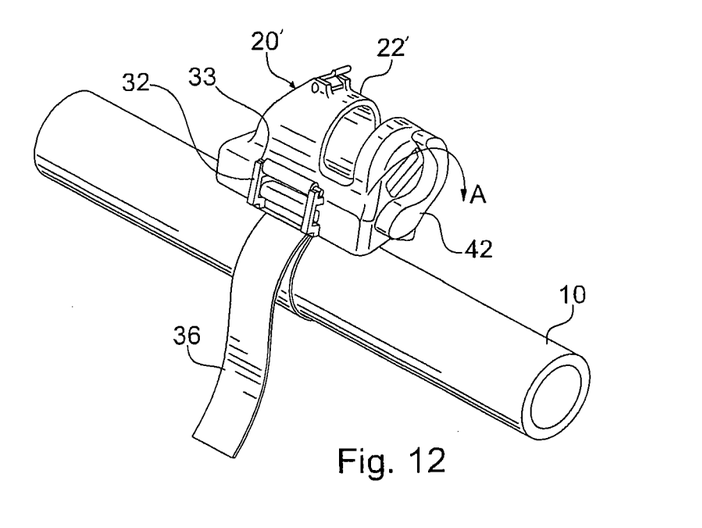
FIG. 12 shows the mounting assembly of FIG. 8 positioned on the bicycle frame component, wherein the strap of the mounting assembly is shown in a tightened state.
Figure 13:
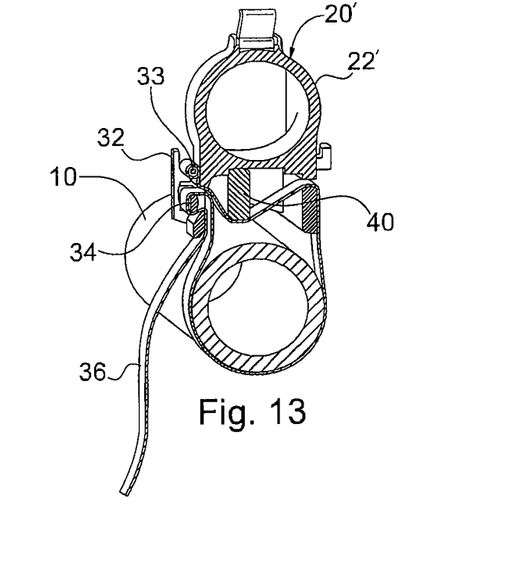
FIG. 13 shows a cross-sectional view of the mounting assembly of FIG. 8 positioned on the bicycle frame component, wherein the strap of the mounting assembly is shown in a tightened state.

Referring to FIGS. 8-16, an exemplary mounting assembly 20' that is an alternative embodiment of the invention will be described. The mounting assembly 20' is substantially the same as in the previous embodiment, but eliminates the bracket insert and re-routes the strap 36. In this embodiment, the strap 36 is routed through a slot 21 in the bracket body 22' as illustrated in FIGS. 8 and 9. Referring to FIGS. 10 and 11, the strap 36 is extended across the bracket body 22' and out a second slot 23 on the opposite side of the bracket body 22'. A pin 33 or the like is attached to the strap 36 and received in the strap support 32 to fix the fixed end of the strap 36. In extending the strap 36 across the bracket body 22', the cam 40 is between the bracket body 22' and the strap 36.

The strap 36 is wrapped around the frame 10 and the free end 37 is fed through the free end strap support 32 and about the strap buckle 34 as shown in FIGS. 10 and 11. The strap free end 37 is pulled such that the strap 36 is firm and snug against the frame 10. To further tighten the mounting assembly 20' to the frame 10, the cam lever 42 is rotated as indicated by arrow A in FIG. 12 such that the cam 40 is rotated to the position illustrated in FIG. 13. Rotation of the cam 40 directly contacts the strap 36 and thereby stretches the strap 36 about the frame 10, hence tightening the mounting assembly 20' on to the frame 10.

Figure 14:
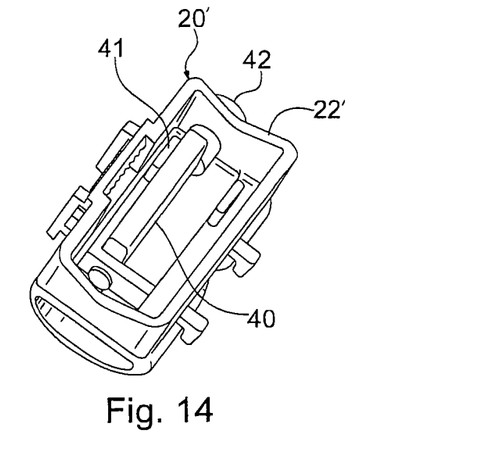
FIG. 14 shows an underside view of the mounting assembly of FIG. 8.
Figure 15:
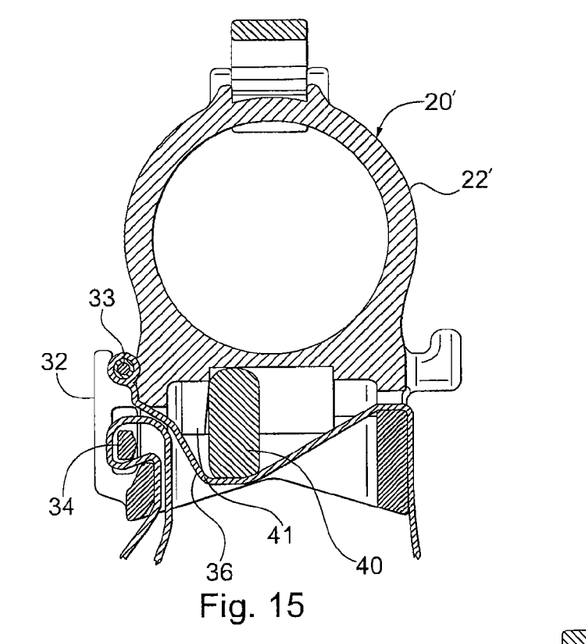
FIGS. 15 and 16 show a cross-sectional view of the mounting assembly of FIG. 8, wherein the strap of the mounting assembly is shown in a tightened state.
Figure 16:
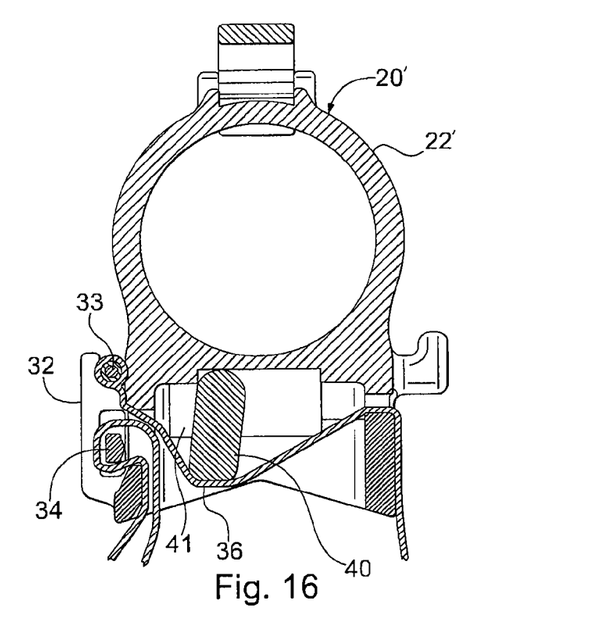

Referring to FIGS. 14-16, in the exemplary embodiment, as the cam 40 is rotated past 90°, for example to about 97° the tension in the strap 36 locks the cam 40 against cam stops 41 in the bracket body 22'. Preferably the angle is between approximately 91 degrees and 100 degrees.

Having described exemplary embodiments of the mounting assembly 20, 20', mounting of an exemplary lock member 12 to the mounting assembly 20, 20' will be is described with reference to FIGS. 17-24. As indicated above, the mounting assemblies of the present invention may be utilized with various locks, but are described herein for example with respect to a U-lock 12 having a locking head 14 with a projecting engagement member 15 extending therefrom. The bracket body 22, 22' may have various configurations to accommodate locks of different configurations and to mate with them in various manners.

Figure 17:
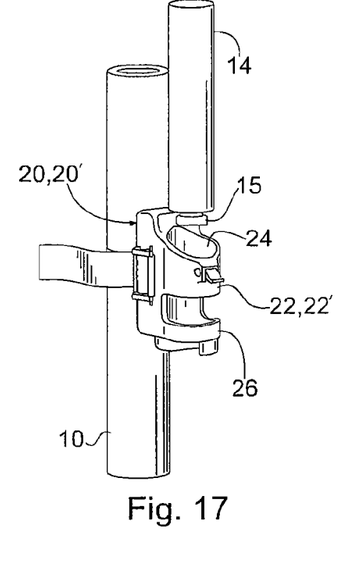
FIGS. 17-24 depict exemplary steps for mounting the lock member to the mounting assembly.
Figure 18:
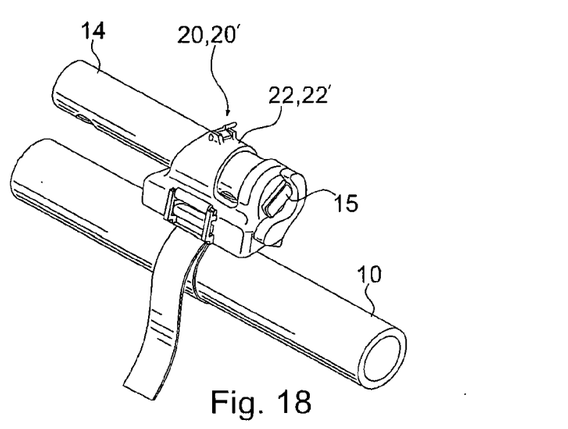
Figure 19:
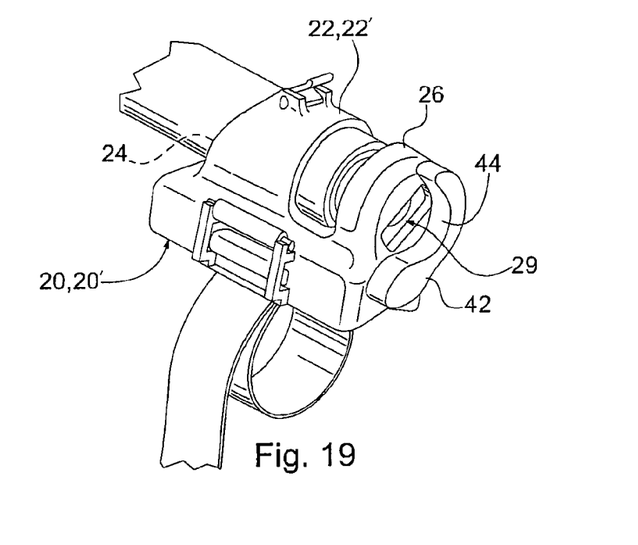
Figure 20:
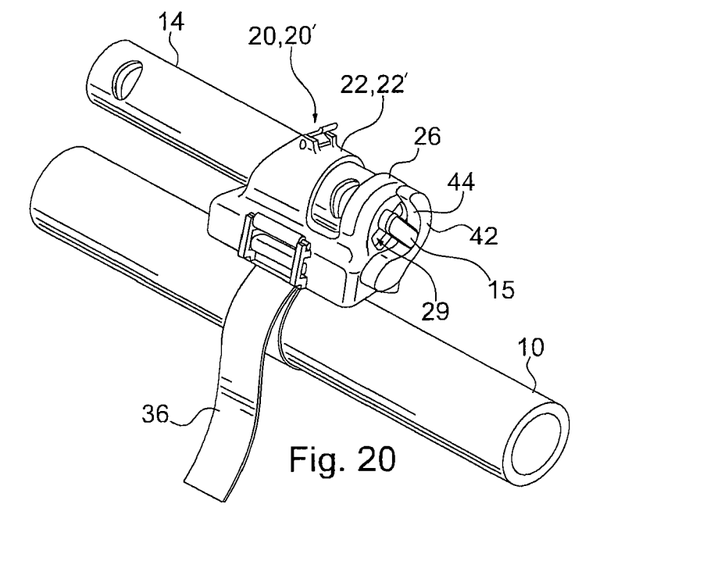
Figure 21:
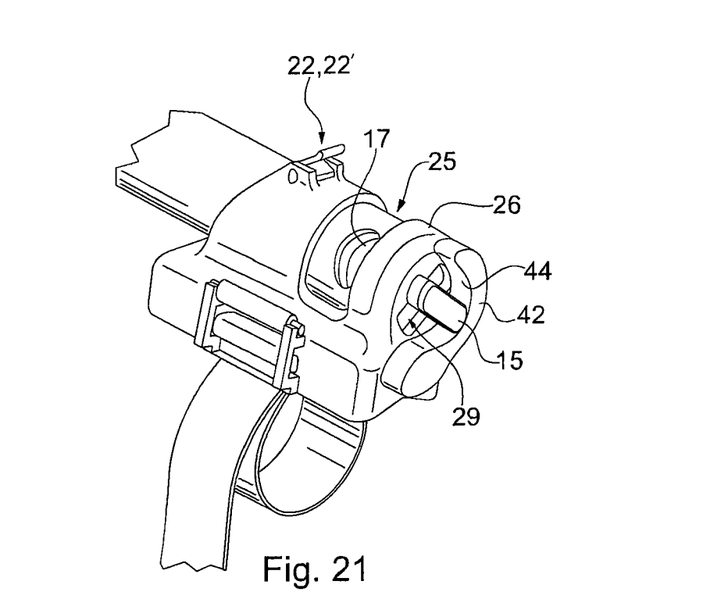
Figure 22:
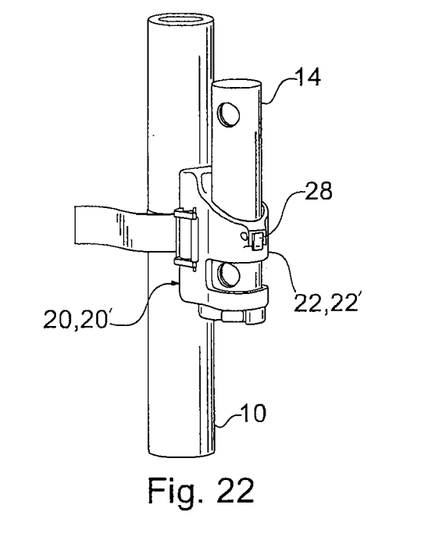
Figure 23:
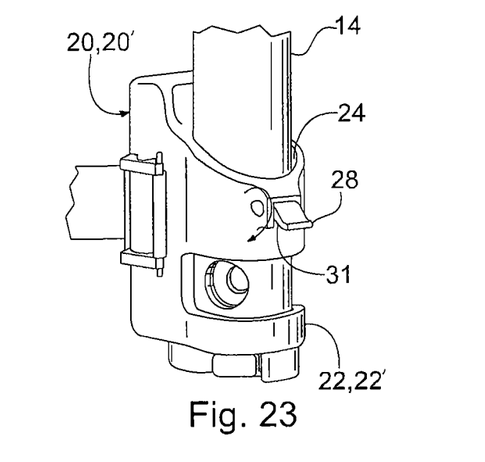
Figure 24:
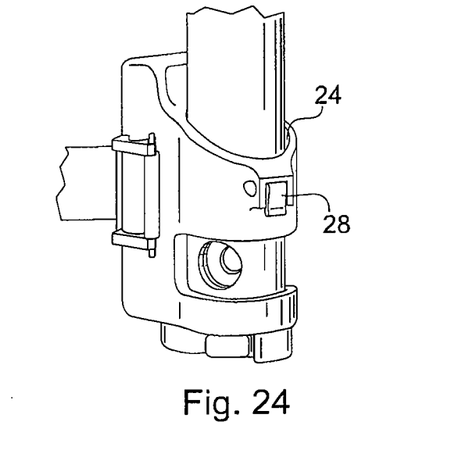

Referring to FIGS. 17-19, the locking head 14 is slid into the lock receiving opening 24 with the engagement member 15 aligned with the slot 29 in the end cap 26 of the bracket body 22, 22'. It is noted with reference to FIG. 19, when the cam lever 42 is rotated to the locked position, it has a contact surface 44 adjacent to the slot 29. Once the engagement member 15 is received through the slot 29, the locking head 14 is rotated to the desired orientation. When the locking head 14 is rotated to the desired orientation, the engagement member 15 rotates from its alignment with the slot 29 and engages the end cap 26 and locks the locking head 14 relative to the bracket body 22, 22' as illustrated in FIGS. 20 and 21. This helps to reduce the possibility of inadvertent dislodging of the locking head 14. The engagement member 15 also engages the contact surface 44 of the cam lever 42 such that the mounting assembly 20, 20' can not be loosened from the frame 10. As also shown therein, the bracket body 22, 22' preferably has a slot 25 configured to align with a lock leg opening 17 in the locking head 14. Once the locking member (for example the U-shackle) is locked to the locking head 14, its extension through the slot 25 prevents the locking head 14 from being slid out of the mounting assembly 20, 20'.

To minimize rattling and/or spinning of the locking head 14, the mounting assembly 20, 20' may further include a tensioning assembly configured to radially tension a portion of the locking head 14 within the lock receiving opening 24. In the illustrated embodiment, the tensioning assembly includes a locking head lever 28 pivotally supported on the bracket body 22, 22' with a caming surface 31 extending through an opening 27 in the bracket body 22, 22' (See FIG. 2). In the open position illustrated in FIG. 23, the locking head lever 28 is rotated outward such that the caming surface 31 is retracted in the opening 27 and does not extend substantially into the lock receiving opening 24. Once the locking head 14 is positioned, the locking head lever 28 is rotated as indicated by arrow B to the locked position shown in FIGS. 22 and 24, wherein the caming surface 31 extends through the opening 27 and creates an interference fit with locking head 14, thus holding the locking head 14 from spinning and/or rattling.

Other tensioning assemblies may also be utilized. For example, in place of the locking head lever, a strap (not shown) may be routed within the lock receiving opening such that it extends about the locking head 14 and thereafter is tensioned against the locking head 14. Such a strap may be a portion of the strap 36 or may be a separate strap. One or more of the straps disclosed in PCT International Appln. No. PCT/US2009/048226 may be utilized as the tension assembly, however, the invention is not limited to such straps.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A portable lock mounting assembly comprising:
   a body defining a lock retaining mechanism, a contact surface and a secondary contact surface that is defined opposite to the contact surface;
   a strap having first and second ends attachable to the body such that a loop facing the contact surface is defined by the strap; and
   a cam member supported by the body and positioned adjacent the contact surface and between the contact surface and the secondary contact surface, the cam member being pivotal between a first position wherein the cam member extends generally parallel to the contact surface and a second position wherein the cam member extends at an angle relative to the contact surface.

2. The portable lock mounting assembly of claim 1 wherein the strap first end is attached to the body in a fix relation and the strap second end is adjustably attached to the body.

3. The portable lock mounting assembly of claim 2 wherein the strap second end is attached to the body via a buckle assembly.

4. The portable lock mounting assembly of claim 1 wherein the body defines a recessed portion about the contact surface with an opening facing the strap loop and the cam members pivotally supported within a confined area.

5. The portable lock mounting assembly of claim 4 wherein a portion of the cam member extends through an opening in the body and is attached to a cam lever outside of the confined area.

6. The portable lock mounting assembly of claim 1 wherein in the first position the cam member applies substantially no biasing force on the secondary contact surface and in the second position the cam member biases the secondary contact surface away from the contact surface.

7. The portable lock mounting assembly of claim 6 wherein biasing the secondary contact surface away from the contact surface causes an increased tension in the strap.

8. The portable lock mounting assembly of claim 1 wherein the secondary contact surface is defined by a bracket insert.

9. The portable lock mounting assembly of claim 8 wherein the bracket insert has a configuration opposite the secondary contact surface which compliments the configuration of the object to which the mounting assembly is to be connected.

10. The portable lock mounting assembly of claim 1 wherein the secondary contact surface is defined by a portion of the strap extending across the body.

11. The portable lock mounting assembly of claim 1 wherein the angle is between approximately 91 degrees and 100 degrees.

12. The portable lock mounting assembly of claim 1 wherein the angle is approximately 97 degrees.

13. The portable lock mounting assembly of claim 1 wherein lock retaining mechanism includes a support surface with an aperture therethrough, the aperture configured to receive a projection extending from a portion of the lock.

14. The portable lock mounting assembly of claim 13 wherein a cam lever extends from the cam member, the cam lever in a first orientation relative to the aperture when the cam member is in the first position and a second orientation relative to the aperture when the cam member is in the second position.

15. The portable lock mounting assembly of claim 14 wherein the cam lever includes a lever contact surface which is positioned adjacent to the aperture in the second orientation.

16. A portable lock mounting assembly comprising:
    a body defining a lock retaining mechanism and a contact surface;
    a strap having first and second ends attachable to the body such that a loop facing the contact surface is defined by the strap; and
    a cam member supported by the body adjacent the contact surface and pivotal between a first position wherein the cam member extends generally parallel to the contact surface and a second position wherein the cam member extends at an angle relative to the contact surface that is greater than 90 degrees.

17. A portable lock mounting assembly comprising:
    a body defining a lock retaining mechanism and a contact surface;
    a strap having first and second ends attachable to the body such that a loop facing the contact surface is defined by the strap; and
    a cam member supported by the body adjacent the contact surface and pivotal between a first position wherein the cam member extends generally parallel to the contact surface and a second position wherein the cam member extends at an angle relative to the contact surface,
    wherein a stop is defined by the body, the stop defining the maximum angle to which the cam member may be pivoted.

18. A portable lock mounting assembly comprising:
    a body defining a lock retaining mechanism and a contact surface, wherein the lock retaining mechanism includes a tensioning assembly configured to engage and secure a lock within the lock retaining mechanism;
    a strap having first and second ends attachable to the body such that a loop facing the contact surface is defined by the strap; and
    a cam member supported by the body adjacent the contact surface and pivotal between a first position wherein the cam member extends generally parallel to the contact surface and a second position wherein the cam member extends at an angle relative to the contact surface.

19. The portable lock mounting assembly of claim 18 wherein the tensioning assembly includes a locking head lever pivotally attached to the body and moveable between a first position wherein a caming surface thereof is spaced from a receiving opening of the lock retaining mechanism and a second position wherein the caming surface is within the receiving opening of the lock retaining mechanism.

* * * * *